(12) United States Patent
Abali et al.

(10) Patent No.: US 10,296,372 B2
(45) Date of Patent: *May 21, 2019

(54) PERFORMANCE OF VIRTUAL MACHINE FAULT TOLERANCE MICRO-CHECKPOINTING USING TRANSACTIONAL MEMORY

(71) Applicant: International Business Machines Corporation, Armonk, NY (US)

(72) Inventors: Bulent Abali, Tenafly, NJ (US); Makoto Ono, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/789,562

(22) Filed: Jul. 1, 2015

(65) Prior Publication Data
US 2016/0378372 A1    Dec. 29, 2016

Related U.S. Application Data

(63) Continuation of application No. 14/749,313, filed on Jun. 24, 2015.

(51) Int. Cl.
*G06F 9/46* (2006.01)
*G06F 11/14* (2006.01)
(Continued)

(52) U.S. Cl.
CPC .......... *G06F 9/467* (2013.01); *G06F 9/45558* (2013.01); *G06F 11/1484* (2013.01);
(Continued)

(58) Field of Classification Search
CPC ............... G06F 7/78; G06F 8/00–8/78; G06F 9/44–9/455; G06F 11/36; G06F 9/45558;
(Continued)

(56) References Cited

U.S. PATENT DOCUMENTS

| 8,239,633 B2 | 8/2012 | Wood et al. |
| 8,417,885 B2 | 4/2013 | Chou et al. |

(Continued)

FOREIGN PATENT DOCUMENTS

WO    2013039494 A1    3/2013

OTHER PUBLICATIONS

Siripoonya et al., Thread-Based Live Checkpointing of Virtual Machines, 2011, IEEE, 2011 IEEE International Symposium on Network Computing and Applications, 155-162 (Year: 2011).*

(Continued)

*Primary Examiner* — Qing Chen
(74) *Attorney, Agent, or Firm* — Patterson + Sheridan, LLP

(57) ABSTRACT

Techniques disclosed herein generally describe providing fault tolerance in a virtual machine cluster using hardware transactional memory. According to one embodiment, a micro-checkpointing tool suspends execution of a virtual machine instance on a primary server. The micro-checkpointing tool identifies one or more memory pages associated with the virtual machine instance that were modified since a previous synchronization. The micro-checkpointing tool maps a first task to an operation to be performed on a memory of the primary server, where the first task is to resume the virtual machine instance. The micro-checkpointing tool also maps a second task to an operation to be performed on the memory of the primary server, where the second task is to copy the identified memory pages associated with the virtual machine instance to a secondary server. The first and second tasks are then performed on the memory.

6 Claims, 5 Drawing Sheets

(51) Int. Cl.
*G06F 11/30* (2006.01)
*G06F 9/455* (2018.01)
*G06F 12/0811* (2016.01)
*G06F 9/54* (2006.01)

(52) U.S. Cl.
CPC ........ *G06F 11/301* (2013.01); *G06F 12/0811* (2013.01); *G06F 2009/45562* (2013.01); *G06F 2009/45575* (2013.01); *G06F 2009/45583* (2013.01); *G06F 2009/45595* (2013.01); *G06F 2201/815* (2013.01)

(58) Field of Classification Search
CPC .... G06F 9/467; G06F 11/1484; G06F 11/301; G06F 12/0811; G06F 2009/45562; G06F 2009/45575; G06F 2009/45583; G06F 2009/45595; G06F 2201/815
USPC .......................................................... 718/1
See application file for complete search history.

(56) References Cited

U.S. PATENT DOCUMENTS

| | | | |
|---|---|---|---|
| 8,656,388 B2 | 2/2014 | Chou et al. | |
| 2002/0032840 A1 | 3/2002 | Campbell | |
| 2010/0131953 A1* | 5/2010 | Dice | G06F 9/466 718/101 |
| 2011/0167195 A1* | 7/2011 | Scales | G06F 9/45558 711/6 |
| 2011/0208908 A1* | 8/2011 | Chou | G06F 11/1662 711/112 |
| 2011/0209155 A1 | 8/2011 | Giampapa et al. | |
| 2012/0124563 A1* | 5/2012 | Chung | G06F 9/467 717/140 |
| 2013/0046936 A1* | 2/2013 | Tran | G06F 9/30047 711/122 |
| 2013/0097384 A1* | 4/2013 | Suzuki | G06F 12/0815 711/124 |
| 2013/0212205 A1* | 8/2013 | Flockhart | H04L 69/40 709/208 |
| 2014/0059333 A1* | 2/2014 | Dixon | G06F 9/3004 712/244 |
| 2014/0164710 A1* | 6/2014 | Ghai | G06F 12/0891 711/135 |
| 2015/0205688 A1* | 7/2015 | Haid | G06F 11/2097 709/212 |
| 2015/0212844 A1 | 7/2015 | Tsirkin et al. | |
| 2016/0188413 A1* | 6/2016 | Abali | G06F 11/1438 714/15 |

OTHER PUBLICATIONS

Sun et al., Fast, Lightweight Virtual Machine Checkpointing, 2010, Georgia Institute of Technology, 7 pages (Year: 2010).*
Wikipedia, "Transactional Synchronization Extensions"; Feb. 18, 2015; <http://en.wikipedia.org/wiki/Transactional_Synchronization_Extensions>, 8 pages.
B. Cully et al.; "Remus: High Availability via Asynchronous Virtual Machine Replication"; NSDI'08 Proceedings of the 5th USENIX Symposium on Networked Systems Design and Implementation; pp. 161-174.
M. Herlihy and J.E.B. Moss; "Transactional Memory: Architectural Support for Lock-Free Data Structures"; ISCA 1993 Proceedings of the 20th annual International Symposium on Computer Architecture, pp. 289-300.
A. Dhoke et al.; "On Closed Nesting and Checkpointing in Fault-Tolerant Distributed Transactional Memory"; IPDPS '13 Proceedings of the 2013 IEEE 27th International Symposium on Parallel and Distributed Processing; pp. 41-52.
I. Goiri et al.; "Checkpoint-based Fault-tolerant Infrastructure for Virtualized Service Provides"; Network Operations and Management Symposium (NOMS), 2010 IEEE; Apr. 19-23, 2010; pp. 455-462.
M. Lu and T. Chiueh; "Fast Memory State Synchronization for Virtualization-based Fault Tolerance"; Dependable Systems & Networks, 2009. DSN '09. IEEE/IFIP International Conference; Jun. 29, 2009-Jul. 2, 2009; pp. 534-543.
International Business Machines Corporation: "Appendix P: List of IBM Patents or Patent Applications Treated As Related", Jun. 30, 2015.
US Patent Application entitled "Performance of Virtural Machine Fault Tolerance Micro-Ceckpointing Using Transactional Memory," U.S. Appl. No. 14/793,313, filed Jun. 24, 2015.
International Business Machines Corporation, "List of IBM Patents or Patent Applications Treated as Related."

* cited by examiner

PERFORMANCE OF VIRTUAL MACHINE FAULT TOLERANCE MICRO-CHECKPOINTING USING TRANSACTIONAL MEMORY

CROSS-REFERENCE TO RELATED APPLICATION

This application is a continuation of co-pending U.S. patent application Ser. No. 14/749,313, filed Jun. 24, 2015. The aforementioned related patent application is herein incorporated by reference in its entirety.

BACKGROUND

Embodiments presented herein generally relate to fault tolerance in virtual machines, and more specifically, to improving micro-checkpointing performance to provide fault tolerance to a virtual machine cluster.

Fault tolerance allows a virtual machine to continue executing with little to no interruption after failure of one or more underlying physical components. Typical techniques for providing fault tolerance include synchronizing virtual machine memory contents executing on a primary server with a copy hosted on a secondary server. As a result, a virtual machine state remains consistent across both the primary and secondary server, so that even if the primary server goes offline (e.g., due to disk failure, power outage, routine maintenance, etc.), the virtual machine may continue to execute uninterrupted on the secondary server.

One approach for providing fault tolerance is micro-checkpointing (also known as continuous migration). Micro-checkpointing is a fault tolerance technique typically used to achieve symmetric multiprocessing (SMP) for host systems in a virtualization environment. In micro-checkpointing, the primary server initially uploads a virtual machine memory to the secondary server. Thereafter, the primary server periodically uploads updated memory pages of virtual machine state information (e.g., I/O state, processor state, network state, etc.) to the secondary server. To do so, the primary server suspends execution of the virtual machine and identifies changes made to the virtual machine since the last upload. The primary server then sends the updated pages and other state information to the secondary server. Suspending execution of the virtual machine prevents the virtual machine from further memory updates while the primary server copies the identified updates to the secondary server, thus preserving consistency between the virtual machine state on the primary server and the secondary server. However, because the primary server is continuously sending memory content to the secondary server while the virtual machine is stopped, performance may suffer.

SUMMARY

One embodiment presented herein describes a method. The method generally includes suspending execution of a virtual machine instance on a primary server. The method also includes identifying one or more memory pages associated with the virtual machine instance that were modified since a previous synchronization. A first task is mapped to a first operation to be performed on a memory of the primary server. The first task is to resume the virtual machine instance. A second task is mapped to a second operation to be performed on the memory of the primary server. The second task is to copy the identified one or more memory pages associated with the virtual machine instance to a secondary server. The first task and the second task are performed on the memory.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

So that the manner in which the above recited features, advantages, and objects of the present disclosure are attained and can be understood in detail, a more particular description of the present disclosure, briefly summarized above, may be had by reference to the embodiments thereof which are illustrated in the appended drawings.

Note, however, that the appended drawings illustrate only typical embodiments of the present disclosure and are therefore not to be considered limiting of its scope, for the present disclosure may admit to other equally effective embodiments.

DETAILED DESCRIPTION

Figure 1:
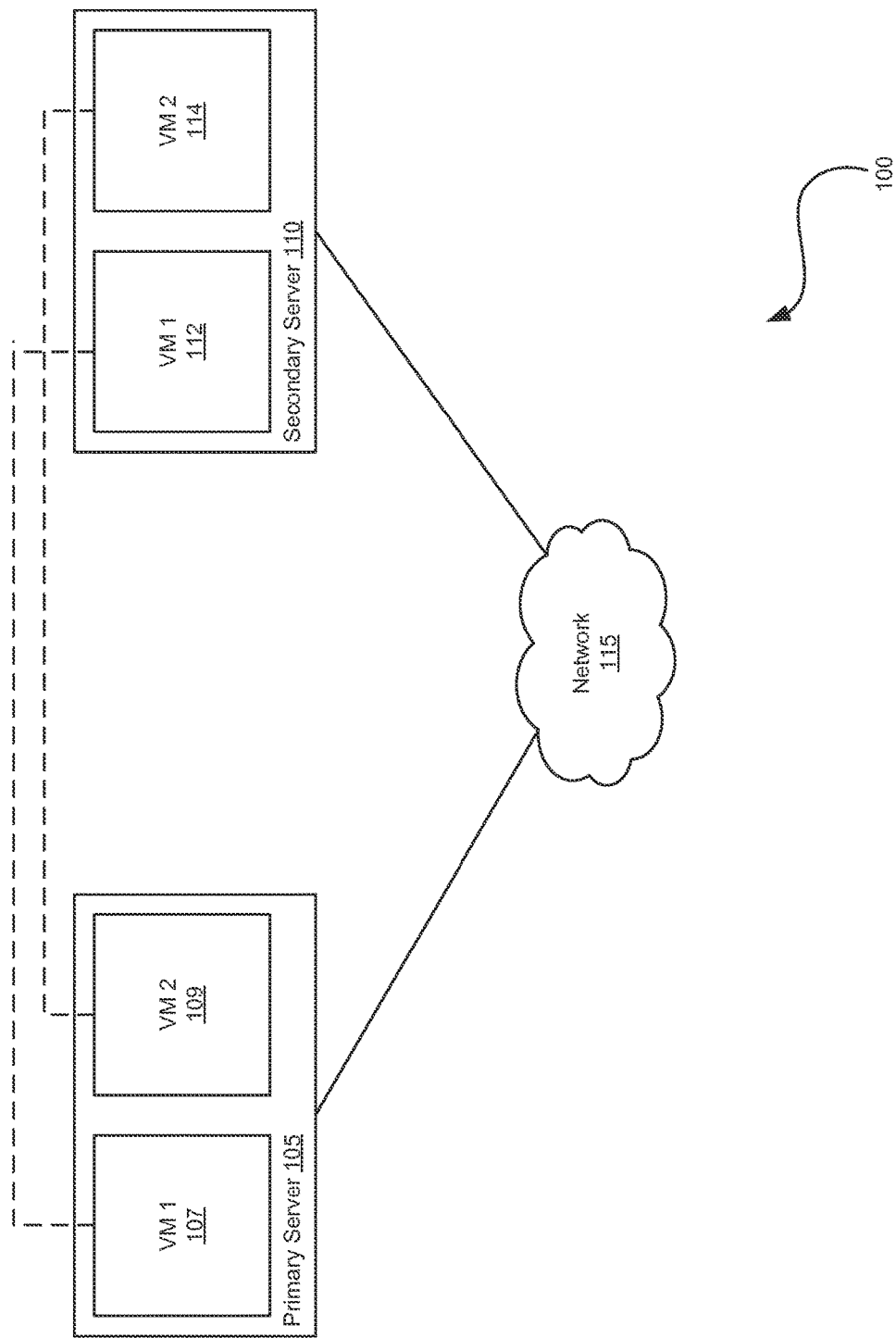
FIG. 1 illustrates an example computing environment, according to one embodiment.

Embodiments presented herein describe techniques for improving performance of micro-checkpointing to provide fault tolerance for a virtual machine cluster. More specifically, the techniques describe mapping operations performed during micro-checkpointing to tasks supported by a hardware transactional memory of a primary server.

Generally, hardware transactional memory avoids unnecessary serialization between concurrent tasks that access a memory. Rather than use process locks to prevent other tasks from accessing the memory while a given task is performed, system processors can perform multiple tasks on the memory concurrently. Further, a background process monitors memory addresses accessed by the task. Typically, if multiple tasks do not access an identical memory address (observed by the background process), results of the tasks are committed to the memory. However, if a memory address is accessed by multiple tasks or one of the tasks otherwise fails (e.g., due a cache overflow, etc.), the processor aborts the tasks and serializes the tasks, e.g., using process locks to perform the tasks and preserve consistency.

In one embodiment, a micro-checkpointing tool synchronizes a virtual machine executing on a primary server with a duplicate of the virtual machine hosted on a secondary server. As known, micro-checkpointing continuously uploads updated memory and state information associated with the virtual machine. Typical micro-checkpointing techniques require suspending execution of the virtual machine to identify and retrieve updated memory pages. Doing so prevents memory from being further modified during synchronization. The typical approach resumes the virtual machine after primary server has completed transferring the updated memory and state information (e.g., I/O state, processor state, network state, etc.). However, one consequence of this approach is that because the virtual machine is suspended during the entire duration of the copy and upload, performance is affected (e.g., in processing and network bandwidth).

In one embodiment, the micro-checkpointing tool maps resuming the virtual machine to a hardware transactional memory task. In addition, the micro-checkpointing tool also maps sending a copy of updated memory pages to the secondary server to another hardware transactional memory task. Thereafter, the micro-checkpointing tool performs the mapped tasks concurrently. Doing so allows the virtual machine to continue executing while the copy of the updated memory pages is taking place. If a conflict between the tasks occurs (e.g., the virtual machine performs a random I/O access to a memory address being copied, an L1 cache corresponding to a given task overflows, either of the tasks otherwise fails, etc.), the micro-checkpointing tool aborts the tasks. If aborted, micro-checkpointing tool resumes the virtual machine. The micro-checkpointing tool may attempt the process again (or serialize the tasks).

Advantageously, performing both tasks concurrently minimizes the amount of time the virtual machine is suspended on the primary server. That is, rather than allow the virtual machine to remain suspended during the entire micro-checkpointing process, the virtual machine is only suspended while the micro-checkpointing tool identifies updated memory pages. Further, mapping micro-checkpointing operations to hardware transactional memory tasks allows a processor in the primary server to more efficiently access local memory when performing the tasks.

FIG. 1 illustrates an example computing environment 100, according to one embodiment. As shown, computing environment 100 includes a primary server 105, a secondary server 110, and a network 115.

In one embodiment, the primary server 105 is representative of a physical computing system. As further described below, the primary server 105 includes a multicore processor configured to support hardware transactional memory tasks. As known, hardware transactional memory allows parallel processes to atomically access shared memory in a system. The secondary server 110 is representative of a physical computing system. In one embodiment, the physical server 105 and the secondary server 110 form a network cluster interconnected via network 115 (e.g., a local area network, the Internet, etc.).

Further, the primary server 105 may include a hypervisor configured to spawn and execute virtual machines (VMs), e.g., VM 1 107 and VM 2 109. The hypervisor provisions physical resources of the primary server 105 to each of the VM 1 107 and VM 2 109, such as memory, processing, and storage capacity. A user may access a VM on the primary server 107 for various purposes. During execution of a given VM, changes to the VM memory, VM file system, storage, etc., may occur. Changes to the VM may be reflected in memory pages of the primary server 105.

In one embodiment, the secondary server 110 serves as a backup physical computing system for the primary server 105. The secondary server 110 maintains backup copies of the VM 1 107 and the VM 2 109 (as VM 1 112 and VM 2 114, respectively, as indicated by the dotted lines). In case the primary server 105 is inaccessible, e.g., due to system failure, network failure, routine maintenance, and the like, the secondary server 110 allows a user to continue to access a VM originally executing on the primary server 105, with little or no interruption.

As further described below, a micro-checkpointing tool continuously sends updates made to each VM hosted by the primary server 107 to the secondary server 110. To obtain the updates, the micro-checkpointing tool first temporarily suspends a given VM. The micro-checkpointing tool scans the memory pages of the primary server 107 to determine whether any updated memory pages for that VM exist. If so, the micro-checkpointing tool copies the updated memory pages and sends the copy (and other state information associated with the VM, such as processor state, I/O state, network state, etc.) to the secondary server 110. In turn, the secondary server 110 sends an acknowledgement to the primary server 105. The primary server 107 resumes the suspended VM.

Figure 2:
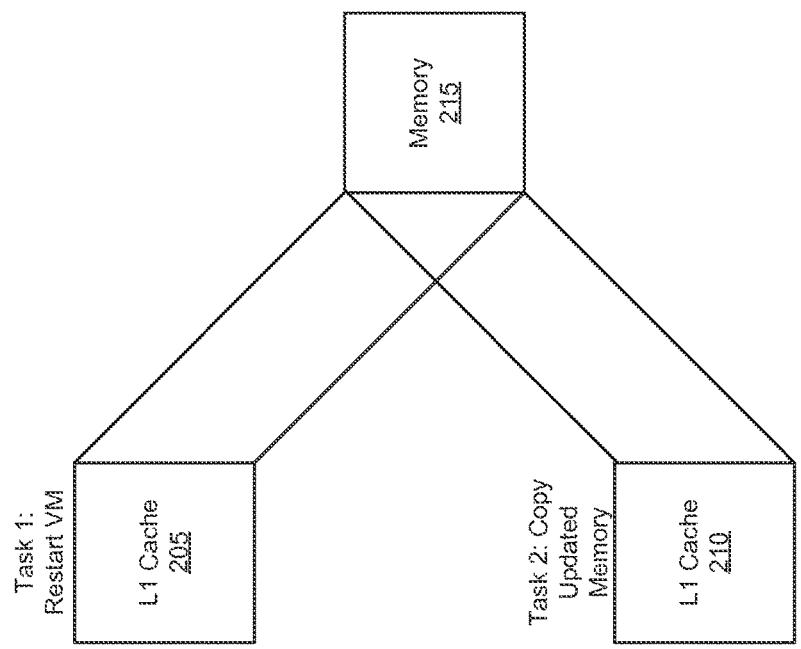
FIG. 2 illustrates an example of mapping micro-checkpointing operation to hardware transactional memory tasks, according to one embodiment.

FIG. 2 illustrates an example of mapping micro-checkpointing operation to hardware transactional memory tasks, according to one embodiment. In one embodiment, the period during which a VM is temporarily suspended during an update on the secondary server 110 can be minimized through the hardware transactional memory of the primary server 105. To do so, the micro-checkpointing tool maps the restart of the VM to a first task (Task 1) to be performed by an L1 cache 205 of the processor. In addition, the micro-checkpointing tool maps the copying of updated memory pages to a second task (Task 2) to be performed by an L1 cache 210 of the processor. The L1 caches 205 and 210 are mapped to a location (e.g., a memory address) in a memory 215.

The micro-checkpointing tool then performs Task 1 and Task 2 concurrently on the respective L1 caches 205 and 210. If both tasks are successful, the processor commits the result of the tasks to the memory 215. Doing so allows the VM to continue executing while the micro-checkpointing tool sends updated memory pages to the secondary server 110.

However, if a conflict occurs (or either of the tasks otherwise fails), then the micro-processing tool aborts the tasks. Because the transfer cycle is mostly a read-only task (i.e., the task writes to a small amount of memory, such as in a pointer update), a conflict generally may arise because of an overflow in either of the L1 caches 205 or 210, such as, if the update is too large for the L1 cache to manage during a transfer cycle. In such a case, the micro-checkpointing tool aborts both tasks, abandoning the previous copy attempt. The micro-checkpointing tool then restarts the VM. The micro-checkpointing tool may re-attempt the update through typical means. That is, rather than map the tasks separately, the micro-checkpointing tool can temporarily suspend the VM and resume the VM after the transfer is complete.

Figure 3:
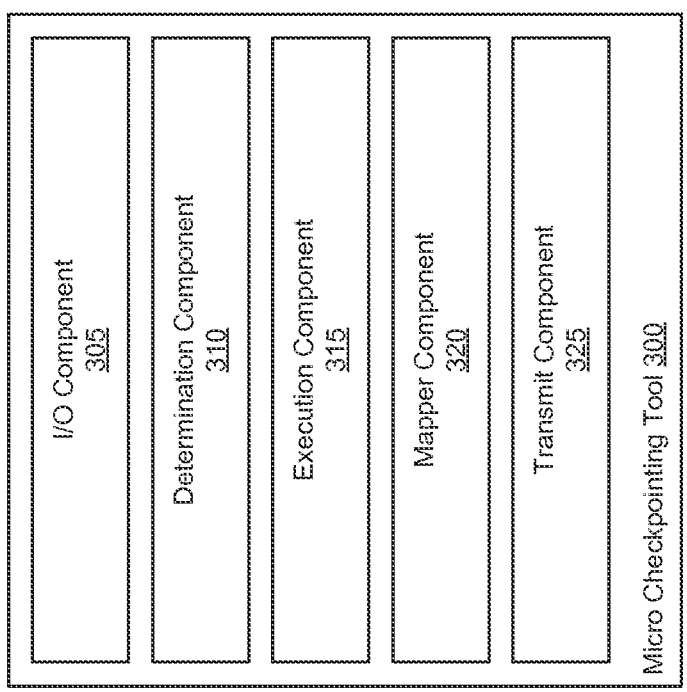
FIG. 3 illustrates a micro-checkpointing tool executing on a primary server of a computing environment, according to one embodiment.

FIG. 3 illustrates an example micro-checkpointing tool 300 executing on the primary server 105. As shown, the micro-checkpointing tool 300 includes an I/O component 305, a determination component 310, an execution component 315, a mapper component 320, and a transmit component 325.

In one embodiment, the I/O component 305 holds I/O to a given VM instance during a micro-checkpointing process. The I/O component 305 does so to avoid dropping I/O operations during the micro-checkpointing process. The I/O component 305 also releases I/O after the micro-checkpointing process is complete.

In one embodiment, the determination component 310 scans memory pages associated with a given VM. The determination component 310 identifies memory pages of the VM that have been updated since a last micro-checkpointing process, if any. Further, the determination component 310 may identify current state information (I/O state, system state, processor state, etc.) associated with the VM.

In one embodiment, the execution component 315 suspends execution of a virtual machine instance on the primary server 105. Doing so allows the determination component 310 to scan the memory pages associated with the VM uninterrupted. Further, the execution component 315 may resume execution of the virtual machine instance.

In one embodiment, the mapper component 320 assigns micro-checkpointing operations to hardware transactional memory tasks. For instance, the mapper component 320 can assign the restart of a VM instance as a first task. In addition, the mapper component 320 can assign the copy and transfer of a memory pages associated with the VM as a second task. The tasks can be carried out by corresponding components, e.g., the execution component 315 may perform the first task, the transmit component 325 may perform the second task, etc.

In one embodiment, the transmit component 320 sends updated memory pages and current VM state information to the secondary server 110. VM state information may include a processor state, memory state, network state, I/O state, and the like. The transmit component 320 may also receive acknowledgements of the sent data from the secondary server 110.

Figure 4:
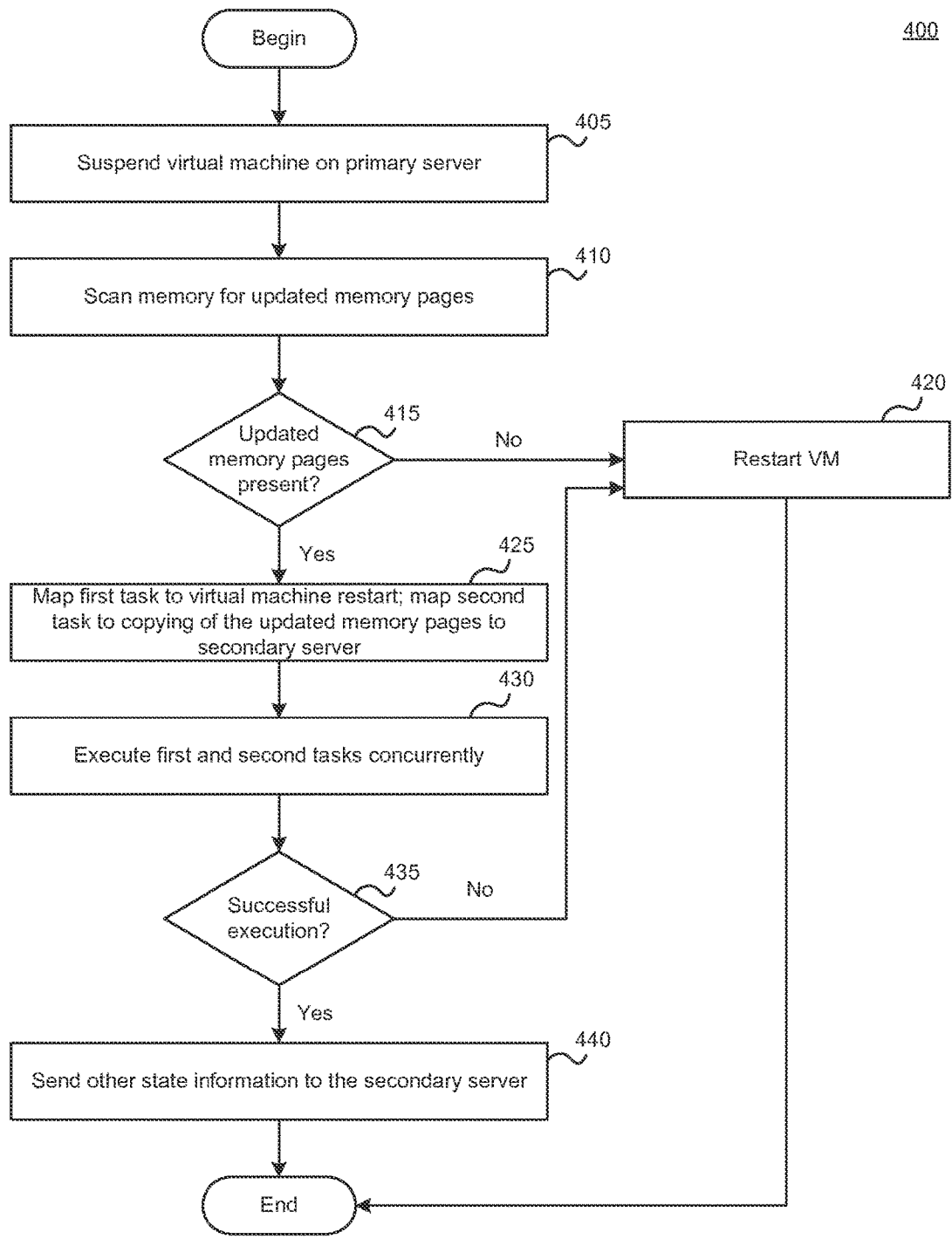
FIG. 4 illustrates a method for updating a virtual machine hosted on a secondary server, according to one embodiment.

FIG. 4 illustrates a method 400 for updating a virtual machine hosted on a secondary server, according to one embodiment. More specifically, method 400 describes a micro-checkpointing process for updating memory and current state information of a virtual machine corresponding to a virtual machine executing on the primary server. In this example, assume that the I/O component 305 holds I/O operations. As shown, method 400 begins at step 405, where the execution component 315 suspends the virtual machine instance on the primary server 105. At step 410, the determination component 410 scans the memory of the primary server. As stated, the determination component 410 does so to identify one or more memory pages associated with the virtual machine have been updated (at step 415).

If no updated memory pages are present, then at step 420, the execution component 315 restarts the virtual machine instance on the primary server 105. That is, the micro-checkpointing tool does not update the virtual machine on the secondary server 110. Otherwise, at step 425, the mapper component 320 maps the virtual machine restart to a first hardware transactional memory task. Also, the mapper component 320 maps the copying of the updated memory pages to the secondary server 110 to a second hardware transactional memory task.

At step 430, the micro-checkpointing tool 300 executes the first and second tasks concurrently. The execution component 315 resumes the virtual machine instance. In addition, the transmit component 320 copies the updated memory pages and sends the pages to the secondary server 435. If successful (at step 435), the transmit component 320 sends other current state information to the secondary server 110. As stated, current state information may include an I/O state, processor state, network state, and the like. In turn, the secondary server 110, upon receiving the updated memory pages and current state information of the virtual machine, sends an acknowledgement to the primary server 105. The secondary server 110 may update the virtual machine instance hosted on the server 110 using the updated pages and current state information. At the end of the micro-checkpointing process, the I/O component 305 releases I/O.

Otherwise, if the first task or second task fails, then the micro-checkpointing tool 300 aborts the tasks. As stated, the tasks can fail in the event of a cache overflow. A cache overflow may occur if the updated memory pages are too large for the L1 cache to accommodate. If the micro-checkpointing tool 300 aborts the tasks, then at step 420, the execution component 315 restarts the virtual machine instance. As stated, the micro-checkpointing tool 300 may reattempt the micro-checkpointing process without mapping operations to hardware transactional memory tasks. Instead, the micro-checkpointing tool 300 performs the update while the virtual machine is suspended. The micro-checkpointing tool resumes the virtual machine after the receiving an acknowledgement from the secondary server 110 (i.e., after the secondary server 110 receives the updated memory pages and current state information).

Figure 5:
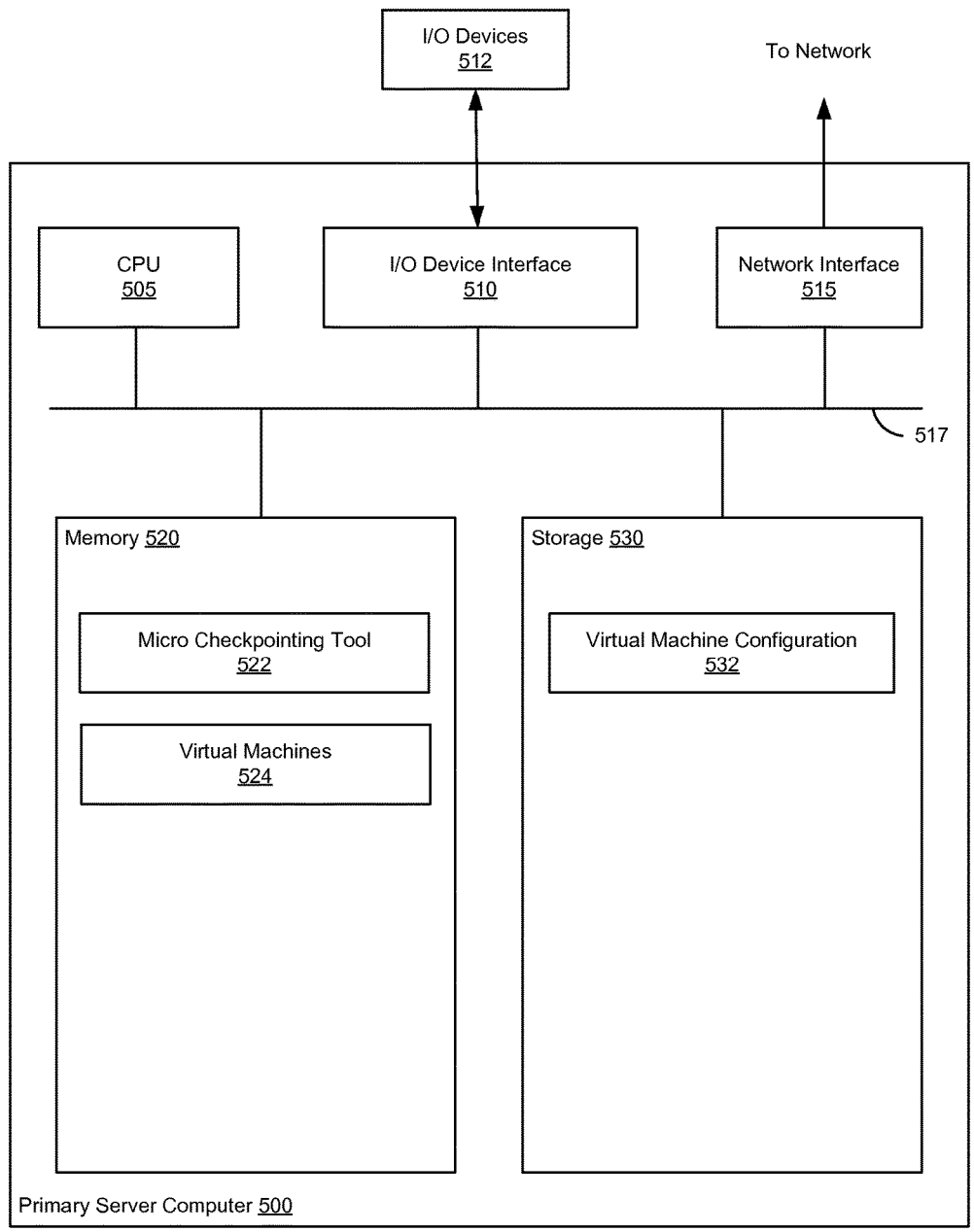
FIG. 5 illustrates an example primary server system configured to update a virtual machine via hardware transactional memory tasks, according to one embodiment.

FIG. 5 illustrates an example primary server computer 500 configured to update a virtual machine via hardware transactional memory tasks, according to one embodiment. As shown, the computing system 500 includes, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in the computing system 500 may correspond to a physical computing system.

CPU 505 retrieves and executes programming instructions stored in memory 520 as well as stores and retrieves application data residing in the storage 530. As stated, the CPU 505 may be configured to support hardware transactional memory tasks to the memory 520. For instance, the CPU 505 may perform operations on multiple L1 caches are transferred to the memory 520. The bus 517 is used to transmit programming instructions and application data between CPU 505, I/O devices interface 510, storage 530, network interface 517, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes a micro-checkpointing tool 522 and virtual machines 524. And storage 530 includes a virtual machine configuration 532. A hypervisor executing on the primary server 500 (not shown) may create and control the virtual machines 524, based on the virtual machine configuration 532. In one embodiment, the micro-checkpointing tool 522 continuously sends updates of a state of a given virtual machine 524 to a secondary server that maintains a copy of the virtual machine 524 for fault tolerance. To do so, the micro-checkpointing tool 522 temporarily suspends the virtual machine 524 to retrieve updated memory pages associated with the virtual machine 524.

In one embodiment, the micro-checkpointing tool 522 assigns micro-checkpointing operations to hardware transactional memory tasks. For instance, the micro-checkpointing tool 522 maps a restart virtual machine operation to a first task. The micro-checkpointing tool 522 also maps a copy updated memory pages operation to a second operation. The micro-checkpointing tool 522 performs both tasks concurrently. Doing so minimizes the amount of time that the virtual machine 524 is suspended. That is, rather than wait until the micro-checkpointing tool has completed sending the updated memory pages and current state information (e.g., I/O state, network state, processor state, etc.) to the secondary server, the virtual machine 524 may restart after the updated memory pages are identified. In the event that either hardware transactional memory task fails (e.g., due to an L1 cache overflow), the micro-checkpointing tool may default to a method that restarts the virtual machine 524 after the sending of the updated memory pages and the current state information is complete.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    suspending execution of a virtual machine instance on a primary server a first time to initiate a micro-checkpointing process on the virtual machine instance;
    identifying one or more memory pages associated with the virtual machine instance that were modified since a previous synchronization;
    mapping a first operation to a first task to be performed on a hardware transactional memory of the primary server, wherein the first operation is to resume the execution of the virtual machine instance on the primary server the first time;
    mapping a second operation to a second task to be performed on the hardware transactional memory of the primary server, wherein the second operation is to copy the identified one or more memory pages associated with the virtual machine instance to a secondary server;
    beginning performance of both the first task and the second task concurrently on the hardware transactional memory of the primary server by executing the first task via a first L1 cache and executing the second task via a second L1 cache; and upon determining that the execution of the first task via the first L1 cache and the execution of the second task via the second L1 cache results in a cache overflow in either the first L1 cache or the second L1 cache, aborting the performance of both the first task and the second task concurrently on the hardware transactional memory of the primary server.

2. The method of claim 1, further comprising:

after aborting the performance of both the first task and the second task concurrently on the hardware transactional memory of the primary server, abandoning the copying of the identified one or more memory pages associated with the virtual machine instance to the secondary server and resuming the execution of the virtual machine instance on the primary server the first time.

3. The method of claim 2, further comprising:

after resuming the execution of the virtual machine instance on the primary server the first time after aborting the performance of both the first task and the second task concurrently on the hardware transactional memory of the primary server, suspending execution of the virtual machine instance on the primary server a second time;

while execution of the virtual machine instance on the primary server is suspended for the second time:

identifying one or more memory pages associated with the virtual machine instance that were modified since a previous synchronization; and copying the identified one or more memory pages associated with the virtual machine instance to the secondary server; and upon receiving an acknowledgement from the secondary server, resuming the execution of the virtual machine instance on the primary server the second time.

4. The method of claim 1, further comprising:

sending state information of the virtual machine instance to the secondary server.

5. The method of claim 4, wherein the state information of the virtual machine instance includes at least one of a processor state, a network state, and an I/O state.

6. The method of claim 1, wherein performing both the first task and the second task concurrently on the hardware transactional memory of the primary server comprises executing the first task on a first processor core and executing the second task on a second processor core in parallel to the execution of the first task on the first processor core.

* * * * *